United States Patent [19]

Ando et al.

[11] Patent Number: 5,191,814
[45] Date of Patent: Mar. 9, 1993

[54] SPEED CHANGE CONTROL SYSTEM IN AUTOMATIC TRANSMISSION

[75] Inventors: Masahiko Ando; Masahiro Hayabuchi, both of Anjo; Kazumasa Tsukamoto, Toyota; Hideo Tomomatsu; Yasuo Hojo, both of Nagoya; Kunihiro Iwatsuki, Toyota, all of Japan

[73] Assignees: Aisan A W Kabushiki Kaisha; Toyota Jidosha Kabushiki Kaisha, both of Aichi, Japan

[21] Appl. No.: 738,381

[22] Filed: Jul. 31, 1991

[30] Foreign Application Priority Data

Aug. 2, 1990 [JP] Japan ................ 2-205881

[51] Int. Cl.$^5$ .................... B60K 41/06
[52] U.S. Cl. ................... 74/866; 74/878
[58] Field of Search ................ 74/866, 878

[56] References Cited

U.S. PATENT DOCUMENTS

| | | | |
|---|---|---|---|
| 4,584,906 | 4/1986 | Nagaoka et al. | 74/866 |
| 4,698,763 | 10/1987 | Smyth | 74/866 X |
| 4,733,580 | 3/1988 | Kubo et al. | 74/866 |
| 4,742,733 | 5/1988 | Schreiner | 74/866 |
| 4,889,015 | 12/1989 | Kondo | 74/866 |
| 4,936,167 | 6/1990 | Mehta | 74/866 |
| 4,982,623 | 1/1991 | Yoshino et al. | 74/866 |
| 4,996,893 | 3/1991 | Nakamura et al. | 74/866 |
| 5,067,373 | 11/1991 | Kyohzuka et al. | 74/866 |

Primary Examiner—Leslie A. Braun
Assistant Examiner—Benjamin Levi
Attorney, Agent, or Firm—Blum Kaplan

[57] ABSTRACT

A control system in an automatic transmission for controlling the change-over of the three speed change patterns which are a speed change pattern having a cross gear ratio on a low speed side, a speed change pattern having a cross gear ratio on a high speed side and a speed change pattern having a normal gear ratio. According to this controlling system, when one of the three speed change pattern is selected based one a throttle opening and a vehicle speed, and when it is judged that the gear shift from a speed range in the present speed change pattern to a speed range in the selected speed change pattern falls under on of prohibited conditions, e.g., requiring engagement and/or disengagement of three or more frictional engaging elements for the gear shift, the gear shift is performed using a temporary speed change pattern (including the present speed change pattern) including a speed range not falling under the prohibited conditions. Thereafter, the pattern selection is repeated and the change-over between speed change pattern is performed under a gear shift condition not falling under the prohibited conditions.

1 Claim, 5 Drawing Sheets

SPEED CHANGE CONTROL SYSTEM IN AUTOMATIC TRANSMISSION

BACKGROUND OF THE INVENTION

1. Field of the Invention

The present invention relates to a speed change control system in a vehicular automatic transmission.

2. Description of the Prior Art

A vehicular automatic transmission is provided with a gear train using plural rows of planetary gear sets, and in which the constituent elements of the planetary gear sets are engaged and released selectively by frictional engaging elements to thereby attain a multiple speed range.

A hydraulic servo mechanism for operating each of the frictional engaging elements is controlled by a hydraulic controller, which in turn is controlled by an electronic controller.

In an automatic transmission having a multiple speed range, a plurality of speed change patterns can be set by selecting speed ranges suitably.

In Japanese Patent Laid Open Gazette No. 21562/1972 there is disclosed an apparatus provided with two kinds of speed change patterns, which are, three and four forward speed range drives of different gear ratios and the speed change patterns are changed over from one to another using a switch. Further, in Japanese Patent Laid Open Gazette No. 48652/1986 there is proposed a technique of changing over speed change patterns from one to another according to accelerator openings in an automatic transmission having six forward speed ranges attained by combining a main transmission having three speed ranges with an auxiliary transmission which attains an overdrive range and a direct drive range.

However, in the technique described in the above Gazette No. 48652/1986, it is provided with a speed change pattern for high throttle opening comprising a row of six forward speed ranges having 1st-1stA-2nd-2ndA-3rd-3rdA speed ranges including 1st-2nd-3rd speed ranges of main transmission speed ranges with the auxiliary transmission serving as a direct drive range and 1stA-2ndA-3rdA speed ranges with the auxiliary transmission serving as an overdrive range (indicated by "A"), and a speed change diagram for controlling the change of speed between the speed ranges at a throttle opening larger than a preset throttle opening value $\theta_0$; and a speed change pattern for low throttle opening comprising a row of four forward speed ranges having 1st-2nd-3rd-3rdA speed ranges of three main transmission speed ranges with the auxiliary transmission serving as a direct drive range plus the third speed range (3A) of the main transmission with the auxiliary transmission serving as an overdrive range, and a speed change diagram for controlling the change of speed between the speed ranges in a throttle opening smaller than the aforementioned preset value $\theta_0$. Further, when the throttle opening is larger than the preset value $\theta_0$, the speed change pattern of the six forward speed ranges described above is selected, while when the throttle opening is smaller than the preset opening, the speed change pattern of the four forward speed ranges referred to above is selected. Therefore, at the time of change-over from the speed change pattern for low throttle opening to the speed change pattern for high throttle opening, the change-over may be done in the same speed range. At the same vehicle speed, however, since the throttle opening in the speed change pattern for low throttle opening is larger than that in the speed change pattern for high throttle opening, a speed change shock may occur at the time of pattern change-over, which may impair the shift feeling.

SUMMARY OF THE INVENTION

It is a primary object of the present invention to provide a speed change control system in an automatic transmission capable of reflecting the driver's will and attaining a suitable gear according to a vehicular running state.

It is another object of the present invention to provide a speed change control system in an automatic transmission wherein the change-over to the selected speed change pattern from the present speed change pattern, even when the selected speed change pattern is elected by the driver's will, is prohibited when carrying out the change-over of a speed change pattern between the speed change pattern is difficult according to a vehicular running state based on vehicle speed, throttle opening and throttle opening change speed, for example, in a state when simultaneous engagements or disengagements of three or more frictional engaging elements are required; and a change-over to a speed range which does not make the change-over from the present speed range difficult according to the vehicle running state is allowed to carry out temporarily; and thereafter a smooth change-over to the desired speed change pattern is carried out.

According to the present invention, an electronic controller as a constituent of the speed change control system in an automatic transmission is provided with a speed change pattern selecting means, a present speed range detecting means and a speed change pattern determining means. The speed change pattern selecting means is provided with means which, when the throttle opening is determined to be smaller than a present value on the basis of information inputted from a throttle opening sensor and a vehicle speed sensor, selects out of the foregoing speed change patterns the one comprising a row of speed ranges large in gear ratio width relative to changes in vehicle speed at below the present throttle opening value and a speed change diagram for controlling the gear shift between speed ranges in the speed range row; and which, when the throttle opening is determined to be larger than the present value, selects out of the foregoing speed change patterns the one comprising a row of speed ranges small in gear ratio width relative to changes in vehicle speed and a speed change diagram for controlling the change of speed gear shift between speed ranges in the speed range row; and which outputs a signal to the speed change determining means. Alternatively, the speed change pattern selecting means is provided with means which, when the state of a vehicle speed equal to or exceeding a preset value has continued for a predetermined time, on the basis of information inputted from the vehicle speed sensor, in place of the throttle opening, selects a speed change pattern comprising a high throttle opening, a row of speed ranges of high vehicle speed type and a speed change diagram for controlling the gear shift between speed ranges in said row of speed ranges, out of plural speed change patterns; and which, when the vehicle speed is lower than the preset value, selects a speed change pattern of a low vehicle speed type; and which outputs a signal to the speed change pattern determining means. The present speed range detecting means is provided with means for detecting the present speed range in the transmission and outputting a signal to the speed change pattern determining means. The speed change pattern determining means is provided with means which judges in a comparative manner whether the change-over from the present speed range detected by the present speed range detecting means to the speed range in the speed change pattern outputted from the speed change pattern selecting means falls under predetermined prohibited conditions or not, on the basis of information provided from the speed change pattern selecting means and that from the present speed range detecting means, and when the judgement is affirmative, outputs to the hydraulic controller a signal for carrying out a speed range change-over to a temporary speed change pattern having a row of speed ranges which includes a speed range not falling under one of the prohibited conditions and a speed change diagram for controlling the gear shift between speed ranges in the speed range row from the present speed range detected by the present speed range detecting means, without outputting a signal from the speed change pattern selecting means to the speed change pattern determining means, and further, outputs a signal for re-starting the electronic controller, or alternatively, when it is judged that the change-over does not fall under the aforementioned prohibited conditions, outputs to the hydraulic controller a signal for carrying out a speed range change-over in accordance with the speed change pattern selected by the speed change selecting means.

According to the present invention there is provided a speed change control system in an automatic transmission comprising a transmission including a gear train which attains plural speed ranges, a hydraulic controller which operates frictional engaging elements of the transmission, and an electronic controller for controlling the hydraulic controller. In the present speed change control system, there is provided a plurality of speed change patterns each comprising a row of speed ranges as a combination of speed ranges of different gear ratios included in the above-identified speed ranges and a speed change diagram for controlling the gear shift between speed ranges in the speed range row; and means for selecting any of the speed change pattern to attain automatic speed change.

The speed change pattern selecting means in the electronic controller selects a speed change pattern comprising a row of speed ranges which is large in gear ratio width relative to change in vehicle speed at a throttle opening below a preset value, out of plural speed change patterns, when the driver's depression of the accelerator pedal is small and the throttle opening is below the preset value, or selects a speed change pattern comprising a row of speed changes which is small in gear ratio width relative to changes in vehicle speed at a throttle opening above the preset value, out of the speed change patterns, when the accelerator pedal depression is large and the throttle opening is above the preset value, on the basis of information on throttle opening; and outputs a signal corresponding to either one of the speed change patterns to the speed change pattern determining means.

The speed change pattern selecting means selects a speed change pattern comprising a row of speed ranges of a high vehicle speed type at a high throttle opening, and a speed change diagram for controlling the gear shift between speed ranges in the speed range row, out of plural speed change patterns, when the state of the vehicle speed equal to or exceeding a preset value has continued for a predetermined time, or selects a speed change pattern comprising a row of speed ranges of a low vehicle speed type out of the speed change patterns when the vehicle speed is lower than the preset value, on the basis of information inputted from the vehicle speed sensor in place of throttle opening; and outputs a signal corresponding to either one of the speed change patterns to the speed change pattern determining means.

The speed change pattern determining means stores said prohibited conditions for prohibiting the change-over between speed ranges of different speed change patterns when the change-over is difficult to carry out, for example, when it is necessary to engage or disengage plural frictional engaging elements simultaneously, and judges in a comparative manner whether the change-over from the present speed range detected by the present speed range detecting means to the speed range in the speed change pattern selected by the speed change pattern selecting means corresponds to one of said prohibited conditions or not. When the judgement is affirmative, the speed change pattern determining means outputs to the hydraulic controller a signal for carrying out a speed range change-over to a temporary speed change pattern having a row of speed ranges which includes a speed range the change-over thereto from the present speed range does not fall under one of the prohibited conditions and also a speed change diagram for controlling the gear shift between speed ranges in said speed range row, without permitting the output of a signal from the speed change pattern selecting means to the speed change pattern determining means, and further outputs a signal for re-starting the operation of the electronic controller, or alternatively when the foregoing change-over does not fall under one of the prohibited conditions, the speed change pattern outputs to the hydraulic controller a signal for carrying out a speed range change-over to the speed change pattern selected by the change pattern selecting means comprising a row of speed ranges and a speed change diagram for controlling the gear shift between speed ranges in the speed range row.

Out of the various sensors referred to above, the throttle opening sensor detects a throttle opening, while the vehicle speed sensor detects a vehicle speed, and these detected data are fed to the speed change patterns selecting means. A larger throttle opening than a preset value indicates the declaration of the driver's intention of running at a higher speed than the present speed when the present vehicular running speed is not so high. Since this is an input information suitable for changing to a speed change pattern wherein the gear ratio is a cross gear ratio, the driver's will can be reflected in the judgment of a speed change pattern.

Once an optimum speed change pattern to be change-over is selected by the speed change pattern selecting means, the present speed range of the transmission is detected by the present speed range detecting means based on informations inputted from the input revolution sensor and the output revolution sensor or stored in the electronic controller, then the speed change pattern determining means judges whether the change-over from the speed range in the present speed change pattern to the speed range in the selected speed change pattern can be carried out or not, on the basis of information inputted from the speed change pattern selecting means and that inputted from the present speed range detecting means, and when it is judged that the change-over is allowable, the speed change pattern determining means outputs a signal to the hydraulic controller which operates a frictional engaging element or elements. Therefore, when it is judged that the change-over to a speed range in the selected speed change pattern can be done by the operation of one or two frictional engaging elements and that the speed changing operation required will not cause difficult operations in the transmission mechanism and does not fall under one of the prohibited conditions, for example when the speed range in the present speed change pattern is set as one of speed ranges in the selected speed change pattern; then the speed change pattern determining means outputs a signal to the hydraulic controller to cause the change-over between speed change patterns to be carried out. When it is judged by the speed change pattern determining means that the speed changing operation to the speed range in the selected speed change pattern falls under one of the prohibited conditions, for example by reason that the operation is required a simultaneous operation of three or more frictional engaging elements, the pattern change-over operation is prohibited without outputting a signal from the speed change pattern selecting means to the speed change pattern determining means, then to the hydraulic controller there is outputted a signal for carrying out a speed range change-over to a temporary speed change pattern comprising a row of speed ranges which includes a speed range not falling under one of the prohibited conditions from the present transmission speed range detected by the present speed range detecting means, and a speed change diagram for controlling the gear shift between speed ranges in the speed range row. At the same time, a signal for re-starting the operation of the electronic controller is outputted, resulting in that the electronic controller again starts the operation of judging an optimum speed change pattern on the basis of information inputted from the speed sensor and that from the throttle opening sensor.

Thus, in the present invention, by utilizing information inputted from the throttle opening sensor and the vehicle speed sensor, there can be attained a change of speed wherein the vehicular driver's will is reflected in the present vehicular running state. Besides, even in the case where a speed change pattern reflecting the driver's will is selected by the speed change pattern selecting means on the basis of the vehicle speed and throttle opening, if the speed change pattern determining means judges that the change-over from the present speed range in the present speed change pattern to the speed range to be attained in the selected speed change pattern may require difficult operations in the transmission mechanism, the speed change pattern determining means prohibits the change-over to the selected speed change pattern and performs the change-over to a temporary change speed pattern including a row of speed ranges comprising speed ranges in the transmission and speed ranges not falling under the prohibited conditions from the present speed ranges and a speed change diagram for controlling the gear shift between speed ranges in the speed range row. Therefore, when relation between the present speed range in one of the speed change patterns which is controlling the change in speed of the transmission at present and a speed range in another speed change pattern to which a change-over should be made in accordance with a change in throttle opening or in vehicle speed falls under one of the prohibited conditions, the speed change of the transmission is carried out as mentioned above without change-over to the speed change pattern selected by the speed change pattern selecting means, and when conditions for carrying out the change-over between speed change patterns in the speed change determining means are satisfied, a gear shift between the speed ranges and a change-over between the speed change patterns, are carried out so that it is possible to make a speed change control in an automatic transmission without any feeling of excessiveness in gear shift.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENT

An embodiment of the present invention will be described in detail hereinunder with reference to the accompanying drawings.

Figure 1:
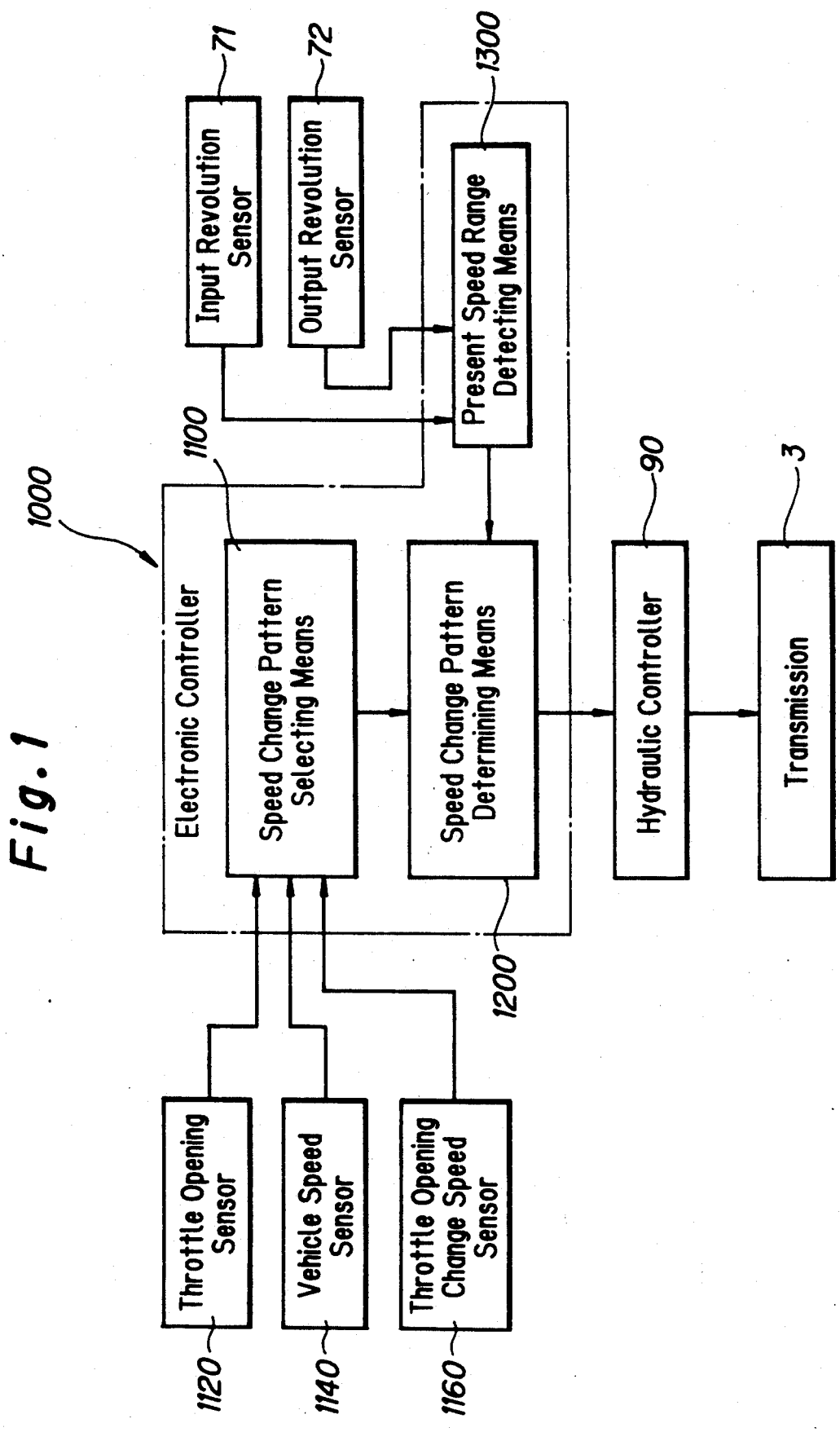
FIG. 1 is a block diagram showing the whole of a speed change controlling system according to the present invention.

FIG. 1 is a block diagram showing an outline of a control system according to the present invention. An electronic controller 1000, the whole of which is enclosed with a dot dash line, has a speed change pattern selecting means 1100, a speed change pattern determining means 1200 and a present speed range detecting means 1300.

The speed change pattern selecting means 1100 receives information as input data from a throttle opening sensor 1120, a vehicle speed sensor 1140 and a throttle opening change speed sensor 1160, then selects a speed change pattern candidate in a manner which will be described later, and outputs the information thereof to the speed change pattern determining means 1200. The present speed range detecting means 1300 detects the present speed range based on information inputted from an input revolution sensor 71 and an output revolution sensor 72 both disposed in a transmission including a gear train or speed range information stored in the electronic controller 1000 and outputs a detected signal to the speed change pattern determining means 1200.

The speed change pattern determining means 1200 receives inputs from the speed change pattern selecting means 1100 and the present speed range detecting means 1300, and determines a speed change pattern and outputs it to a hydraulic controller 90.

The hydraulic controller 90 operates a hydraulic servo mechanism of a frictional engaging apparatus in a transmission 3 including a gear train to form a multiple speed range required.

Figure 2:
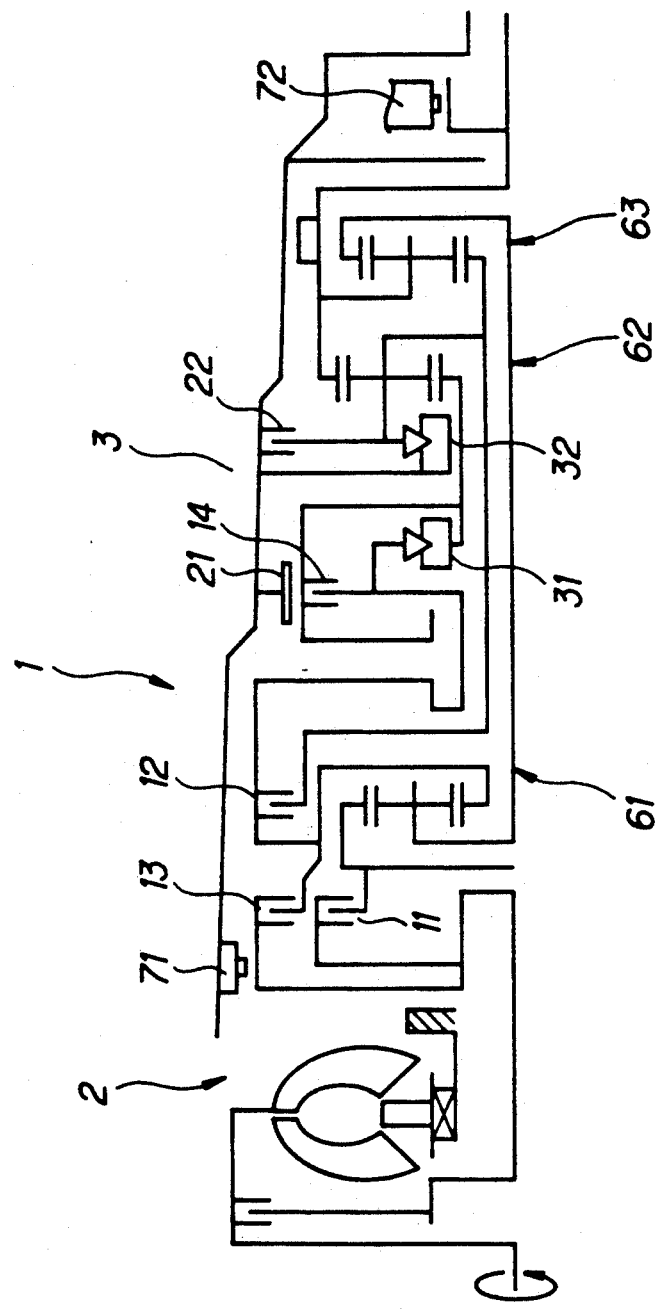
FIG. 2 is an explanatory view showing a skeleton of a transmission.

The transmission 3 including a gear train will now be outlined with reference to FIG. 2. An automatic transmission 1 is provided with a starting device 2 and the transmission 3 which has a plural set of planetary gear. As the starting device 2, a torque converter is illustrated in this embodiment. However, there can be used other suitable means such as, for example, fluid coupling, electromagnetic clutch, multiple disc clutch, or centrifugal clutch.

The transmission 3 contains in a case a planetary gear train and a frictional engaging device. As the planetary gear train there are provided three rows of simple planetary gear sets 61, 62 and 63. A carrier of the first simple planetary gear set 61 is connected to a ring gear of the third simple planetary gear set 63, while a carrier of the third simple planetary gear set 63 is connected to a ring gear of the second simple planetary gear set 62 and also connected to an output shaft. A sun gear of the third simple planetary gear set 63 is connected to a carrier of the second simple planetary gear set 62 and also connected to a sun gear of the second simple planetary gear set 62 through the frictional engaging device.

The frictional engaging device includes four clutches, two brakes and two one-way clutches. A connective relation between the frictional engaging device and the constituent elements of the planetary gear train is as follows.

An input shaft of the transmission 3 is connected to both a drum of a first clutch 11 and a drum of a third clutch 13. A hub of the first clutch 11 is connected to a ring gear of the first simple planetary gear set 61, while a hub of the third clutch 13 is connected to a sun gear of the first simple planetary gear set 61. The hub of the third clutch 13 is also connected to a drum of a clutch 12 and is further connected to a hub of a fourth clutch 14 and an outer race of a first one-way clutch 31.

A hub of the second clutch 12 is connected to the sun gear of the third simple planetary gear set 63 through a second intermediate shaft and is also connected to the carrier of the second simple planetary gear set 62. This carrier is further connected to an outer race of a second one-way clutch 32 which also serves as a hub of a second brake 22. An inner race of the second one-way clutch 32 is attached to a case which is a stationary member.

The drum of the fourth clutch 14, which also serves as a drum of a brake 21, is connected to the sun gear of the second simple planetary gear set 62 through an inner race of the first one-way clutch 31 and a third intermediate shaft.

The carrier of the first simple planetary gear set 61 is connected to the ring gear of the third simple planetary gear set 63 through a first intermediate shaft, while the carrier of the third simple planetary gear set 63 is connected to the output shaft and the ring gear of the second simple planetary gear set 62.

Outside the third clutch 13 which is directly connected to an input shaft there is provided, on the transmission case, a first revolution sensor 71 to obtain a revolution information of the input shaft, and also outside the output shaft there is provided, on the transmission case, a second revolution sensor 72 to obtain a revolution information of the output shaft.

In this transmission, there can be attained eight forward speed ranges and one reverse speed range by the engagement and release of frictional engaging elements.

Table 1 shows engaged and disengaged states of frictional engaging elements which attain eight forward speed ranges and one reverse speed range. In the same table, the O mark indicates engagement.

For example, such gear ratios and gear ratio steps (ratio between the gear ratios) as shown in Table 1 can be obtained by selecting a suitable number of teeth of each constituent gear of the three planetary gear sets 61, 62 and 63.

The eight forward speed ranges are named 1st, 2nd, 2.5th, 3rd, 3.2nd, 3.5th, 4th and 5th speed ranges, respectively, and this is based on gear ratios attained by the speed ranges shown in Table 1.

The 4thA speed range shown in Table 1 is a speed range which appears at the time of gear shift from 4th to 5th speed range. It is used mainly for smoothing the hydraulic control, and the gear ratio thereof is the same as that of 4th range.

According to the construction of this transmission, as is apparent from FIG. 1 and Table 1, there is formed a transmission with five forward speed ranges as a base having a cross gear ratio by the engagement of the first brake 21.

TABLE 1

| SHIFT POSITION | CLUTCH 11 | CLUTCH 12 | CLUTCH 13 | CLUTCH 14 | BRAKE 21 | BRAKE 22 | ONE-WAY CLUTCH 31 | ONE-WAY CLUTCH 32 | GEAR RATIO | | GEAR RATIO STEP |
|---|---|---|---|---|---|---|---|---|---|---|---|
| 1st | O | | | O | | (O) | O | O | $1.084 + 1.429 \times 1.405$ | 3.092 | 1.54 |
| 2nd | O | O | | | | (O) | | O | $1.429 \times 1.405$ | 2.008 | 1.26 |
| 2.5th | O | | | O | O | | | O | $1.429 \times 1.405 - 0.415$ | 1.593 | 1.13 |
| 3rd | O | | O | | | (O) | | O | $1 \times 1.405$ | 1.405 | 1.09 |
| 3.2nd | O | O | | | O | | | | $1.429 \times 1.405 - 0.722$ | 1.286 | 1.15 |
| 3.5th | O | | O | | O | | | | $1 \times 1.405 - 0.291$ | 1.114 | 1.11 |
| 4th | O | O | O | | | | O | | $1 \times 1$ | 1.000 | 1.00 |
| 4thA | | O | O | | | | O | | | 1.000 | 1.40 |
| 5th | | O | O | | O | | | | | 0.717 | |
| REVERSE | | | O | O | | O | | | | 2.529 | |

(O): Engages at coasting (braking effected by brake horsepower of engine)

Normally using all of the eight forward speed ranges is not always desirable because of so-called busy shift. Therefore, for example in a passenger car, there are set the following three kinds of speed change patterns each comprising a row of speed ranges and a speed change diagram for controlling the gear shift between speed ranges in the speed range row.

First Speed Change Pattern a pattern for normal running, using 1st, 2nd, 3rd, 4th and 5th speed ranges.

Second Speed Change Pattern a pattern having a cross gear ratio on low speed side, 1st, 2nd, 2.5th, 3.2nd, 4th and 5th speed ranges.

Third Speed Change Pattern a pattern of a cross gear ratio on high speed side, using 1st, 2nd, 3rd, 3.5th, 4th and 5th speed ranges. (This speed change pattern can be regarded as a higg throttle opening, high vehicle speed type speed change pattern in comparison with the above first and second speed change patterns.)

The following description is now provided about the operations of the frictional engaging elements at the time of gear shift between speed ranges in the above three kinds of speed change patterns.

(1) First Speed Change Pattern

This speed change pattern uses five speed ranges of 1st, 2nd, 3rd, 4th and 5th speed ranges. In a normal running state, this pattern is used.

Engaging and disengaging operations of the frictional engaging elements at the time of gear shift between speed ranges in this speed change pattern will be confirmed below with reference to FIG. 1 and Table 1.

Neutral to 1st speed range

The first and fourth clutches 11, 14 are engaged. (The first and second one-way clutches 31, 32 assume an engaged state.)

1st to 2nd speed range

The second clutch 12 is engaged and the fourth clutch 14 is released. (The first one-way clutch 31 assumes a released state.)

2nd to 3rd speed range

The third clutch 13 is engaged and the second clutch 12 is released. Clutch-clutch control is made.

3rd to 4th speed range

The second clutch 12 is engaged. (The first one-way clutch 31 assumes an engaged state and the second one-way clutch 32 assumes a released state, respectively.)

4th to 5th speed range

The first clutch 11 is released and the first brake 21 engaged. (The first one-way clutch 31 assumes a released state.)

(2) Second Speed Change Pattern

This speed change pattern uses six speed ranges of 1st, 2nd, 2.5th, 3.2nd, 4th and 5th speed ranges. In comparison with the first speed change pattern, two speed ranges of 2.5th and 3.2nd are inserted between 2nd and 4th speed ranges to narrow the gear ratio step therebetween, thereby obtaining a so-called cross gear ratio on low speed side. The accelerating performance particularly at medium and low vehicle speeds is improved by the cross gear ratio.

The engagement and release of frictional engaging elements in the gear shift between speed ranges which appear for the first time in this speed change pattern are confirmed as follows.

2nd to 2.5th speed range

The release of the second clutch 12 and the engagement of the first brake 21 are controlled simultaneously. The fourth clutch 14 is engaged. (The first one-way clutch 31 assumed an engaged state.) A simultaneous clutch brake control is made.

2.5th to 3.2nd speed range

The second clutch 12 is engaged.
The fourth clutch 14 is released.
(The first one-way clutch 31 assumes a released state.)

3.2nd to 4th speed range

The third clutch 13 is engaged and the first brake 21 is released. (The first one-way clutch 31 assumes an engaged state.)

(3) Third Speed Change Pattern

This speed change pattern uses six speed ranges of 1st, 2nd, 3rd, 3.5th, 4th and 5th speed ranges. In comparison with the first running pattern, 3.5th speed range is inserted between 3rd and 4th speed ranges to attain a cross gear ratio therebetween. The accelerating performance at high vehicle speeds (high throttle opening) is improved by this cross gear ratio.

The engagement and release of frictional engaging elements in the gear shift between speed ranges which appear for the first time in this speed range pattern are confirmed as follows.

3rd to 3.5th speed range

The first brake 21 is engaged.
(The second one-way clutch 32 assumes a released state.)

3.5th to 4th speed range

The second clutch 12 is engaged and the first brake 21 is released. (The first one-way clutch 31 assumes an engaged state.)

Figure 3:
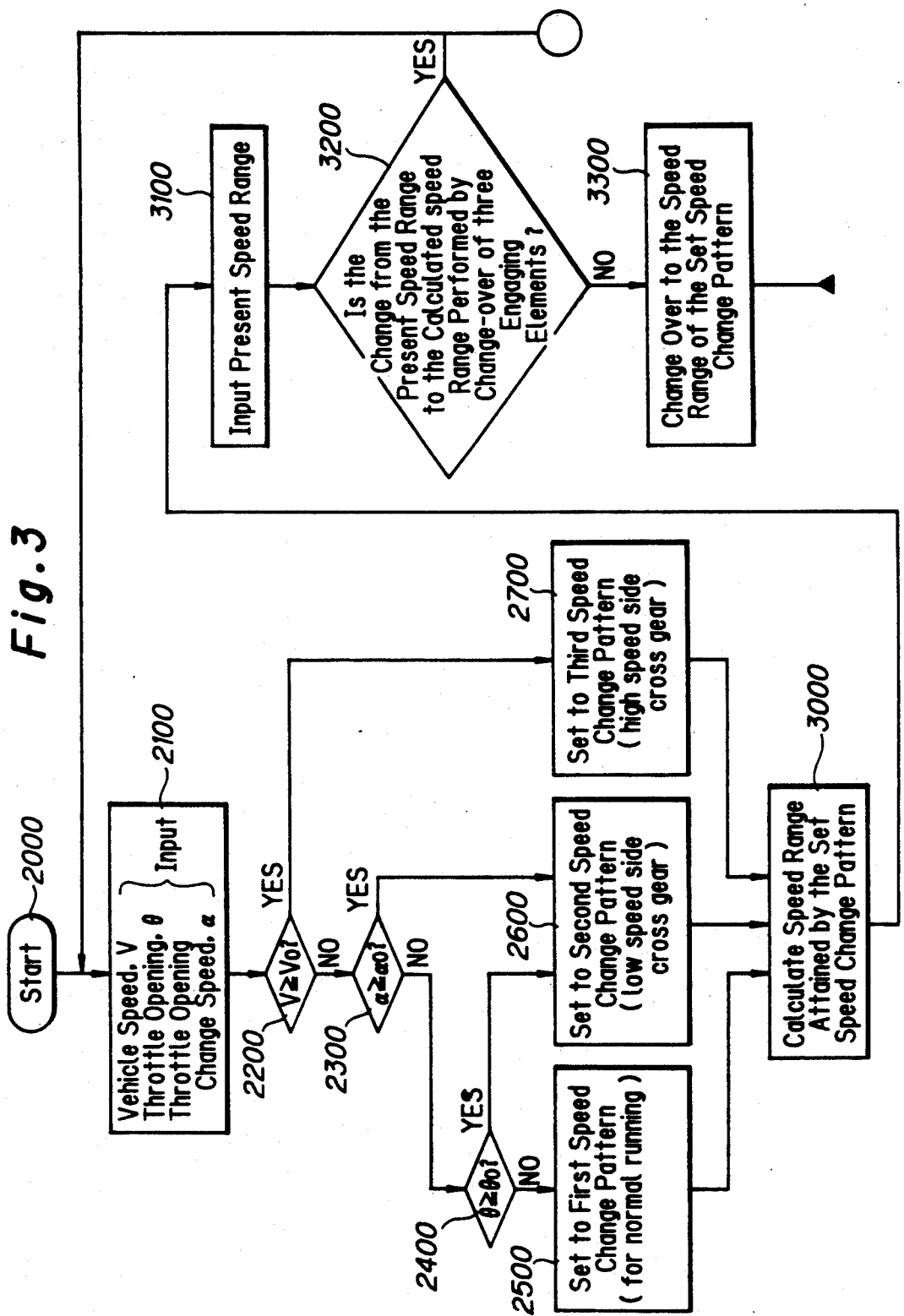
FIG. 3 is a control flowchart.

FIG. 3 is a flowchart of control for selecting the above three kinds of speed change patterns in the electronic controller 1000.

The control is started in step 2000, then a throttle opening $\theta$, a vehicle speed V and a throttle opening change speed $\alpha$ are inputted in step 2100.

In step 2200 there are made a comparison to whether the present vehicle speed V inputted in step 2100 is higher than a preset vehicle speed value $V_0$ or not and a comparison as to whether the vehicle speed V is continued in excess of a preset time or not. If it is judged that the present vehicle speed V is not in excess of the preset value $V_0$, or a vehicle speed exceeding the preset value has not been continued in excess of the preset time, the processing routine advances to step 2300.

In step 2300, the present throttle opening change speed $\alpha$ inputted in step 2100 is compared with a preset throttle opening change speed value $\alpha_0$. If the present throttle opening change speed $\alpha$ is lower than the preset value $\alpha_0$, the processing routine advances to step 2400.

In step 2400, the present throttle opening $\theta$ inputted in step 2100 is compared with a preset throttle opening value $\theta_0$. If the present throttle opening $\theta$ is smaller than the preset value $\theta_0$, the processing routine advances to step 2500, in which the speed change pattern is set to the first speed change pattern for normal running, then the processing routine advances to step 3000.

If in step 2300 it is judged that the present throttle opening change speed $\alpha$ has reached or exceeds the preset value $\alpha_0$, or if it is judged in step 2400 that the present throttle opening $\theta$ is equal to or larger than the preset value $\theta_0$, the processing routine advances to step 2600, in which the speed change pattern is set to the second speed change pattern wherein a cross gear ratio is attained between low speed side speed ranges.

Further, if it is judged in step 2200 that the present vehicle speed V is equal to the preset value $V_0$ or a vehicle speed higher than the preset value $V_0$ has continued in excess of the preset time, the processing routine advances to step 2700, in which the speed change pattern is set to the third speed change pattern wherein a cross gear ratio is attained between high speed side speed ranges, then the processing routine advances to step 3000.

In step 3000, a speed range to be attained in each speed change pattern which has been set is calculated, then the processing routine advances to step 3100. In step 3100, the present speed range is inputted, then the processing routine advances to step 3200.

In step 3200, there is made a judgment as to whether the gear shift from the present speed range to the speed range calculated in step 3000 involves difficulty or not.

In the transmission of this embodiment, eight forward speed ranges are attained by using three rows of simple planetary gear sets and a small number of frictional engaging elements consisting of four clutches, two brakes and two one-way clutches, so a multiple speed range can be attained by a compact construction. In some cases, however, difficulty is involved in the gear shift to a specific range.

More particularly, for the change-over between 2.5th and 3rd speed ranges in Table 1, it is necessary to perform simultaneous engagement and disengagement of three frictional engaging elements which are release and engagement of the first brake 21, engagement and release of the third clutch 13 and release and engagement of the fourth clutch 14. Likewise, for the change-over between 3rd and 3.2nd speed ranges in Table 1, it is necessary to perform simultaneous engagement and disengagement of three frictional engaging elements which are engagement and release of the second clutch 12, release and engagement of the third clutch 13 and engagement and release of the first brake 21. In both cases, not only the control of the hydraulic controller is troublesome, but also there occurs a speed change shock at the time of gear shift.

In the gear shift from 3.2nd to 3.5th speed range, the second clutch 12 is released and the third clutch 13 is engaged. As shown in the skeleton of FIG. 2, the clutch drum of the second clutch 12 and the clutch hub of the third clutch 13 are integrally connected with each other. For simultaneous control of the release of the second clutch 12 and the engagement of the third clutch 13, it is necessary to detect transfer torque of both clutches and make a feedback control while monitoring the torque. In the above construction, however, there is no means for detecting transfer torques of both clutches at a time and so actually it is impossible to make the control. This is also the case in the gear shift from 3.5th to 3.2nd speed range.

Therefore, the change-over between speed ranges requiring such complicated control and the change-over between speed ranges requiring simultaneous engagement and disengagement of three or more frictional engaging elements are stored as prohibited conditions in the speed change pattern determining means, and when the change-over from the present speed range in the transmission to a selected speed range in a selected speed change pattern does not fall under one of the above prohibited conditions at the time of determining the change-over, the speed change pattern determining means determines the change-over to the selected speed change pattern, while when the change-over falls under any one of the above prohibited conditions, the speed change pattern determining means prohibits the change-over to the selected speed change pattern and outputs to the hydraulic controller a signal for carrying out a change-over from the present speed range to a speed range not falling under the above prohibited conditions in a temporary speed change pattern including a row of speed ranges and a speed change diagram for controlling the gear shift between speed ranges in the row. At the same time, the speed change pattern determining means outputs a signal for re-starting the operation of the electronic controller. Thus, in the transmission, although the speed change pattern change-over determined by the speed change pattern determining means has been prohibited, the gear shift from the present speed range to the speed range not falling under any of the prohibited conditions is carried out without inducing any shock, and the gear shift is controlled by both the temporary row of speed range including the speed range not falling under any one of the prohibited conditions and the speed change diagram for controlling the gear shift between speed ranges in the speed range row. At the same time, once the electronic controller is re-started, the selection of a speed change pattern and the judgment as to whether the change-over to a selected speed change in the selected speed change pattern falls under the foregoing prohibited conditions or not are performed again by the speed change pattern selecting means and the speed change pattern determining means. These operations are performed until there is made a change-over to a speed change pattern decided finally by the speed change pattern determining means.

Thus, even when the speed change pattern determining means in the electronic controller determines new speed change pattern to be changed-over based on the selection made by the speed change pattern selecting means, there is once performed a gear shift from the present speed range to a speed range in the present pattern or in another speed range pattern, or this gear shift is performed as a temporary intermediate step, and then there is made a change-over to the speed change pattern determined finally by the speed change pattern determining means, so that there is no risk of the vehicular running characteristic being impaired at the time of the foregoing change-over between preset plural speed change patterns.

When the speed change pattern determining means has prohibited the change-over between preset plural speed change patterns on the ground that the gear shift from the present speed range to the selected speed range falls under one of the prohibited conditions, it is assumed that the following are included in the speed range change-over from the present speed range to a speed range in a speed range row not falling under the prohibited conditions for the present speed range using a speed change diagram for controlling the gear shift between speed ranges in the speed range row.

i) A gear shift is made temporarily to a speed range not falling under any one of the foregoing prohibited conditions included in another speed change pattern comprising a row of speed ranges not including the present speed range and including the speed range to which the gear shift from the present speed range does not fall under the prohibited conditions and a speed range diagram for controlling the gear shift between speed ranges in the speed range row, and then a changeover is made to a speed change pattern decided by the speed change pattern determining means.

ii) A gear shift is made from the present speed range to a speed range included in another speed range pattern comprising a row of speed ranges including the present speed range and also including a speed range to which the gear shift from the present speed range falls under the prohibited conditions and a speed range diagram for controlling the gear shift between speed ranges in the speed range row, and after controlling the gear shift in accordance with the speed change pattern, a change-over is made to a speed change pattern decided by the speed change pattern determining means.

iii) A change-over is made from the present speed range or from a speed range not falling under the prohibited conditions included in the present speed change pattern to another speed range pattern comprising a row of speed ranges including the present speed range and also including a speed range to which the gear shift from the present speed range does not fall under the prohibited conditions and a speed change diagram for controlling the gear shift between speed ranges in the speed range row, and after controlling the gear shift in accordance with said speed change pattern, a change-over is made to a speed change pattern decided by the speed change pattern determining means.

iv) A change-over is made to a speed change pattern decided by the speed change pattern determining means through another speed change pattern comprising a row of speed ranges not including the present speed range and including a speed range to which the gear shift from the present speed range falls under the prohibited conditions, temporarily.

The above operations of the electronic controller 1000 shown in FIG. 3 will be explained below synthetically.

When the vehicle has started running and the present vehicle speed V is lower than the preset vehicle speed value $V_0$, the throttle opening change speed $\alpha$ is lower than the preset throttle opening change speed value $\alpha_0$ and the throttle opening $\theta$ is smaller than the preset throttle opening value $\theta_0$, the first speed change pattern for normal running is selected in the automatic transmission.

Since the throttle opening change speed $\alpha$ is a speed at which the throttle opening changes, namely, the driver's throttle pedal depressing speed, the state wherein throttle opening change speed $\alpha$ is equal to or larger than the preset value $\alpha_0$ indicates the driver's desire to drive at a higher speed than the present vehicle speed or desire to make shiftdown. Therefore, when the vehicle speed V judged in step 2200 is lower than the preset value $V_0$ and the throttle opening change speed $\alpha$ judged in step 2400 is equal to or higher than the preset value $\alpha_0$, the processing routine advances to step 2600, in which there is selected the second speed change pattern of a low speed side cross gear ratio.

When the vehicle speed V is lower than the preset value $V_0$, the throttle opening change speed $\alpha$ is lower than the preset value $\alpha_0$ and the present throttle opening $\theta$ judged in step 2400 is equal to or higher than the preset throttle opening value $\theta_0$, it is meant that the vehicle speed V is not so high and the accelerator pedal is not depressed abruptly, but that the amount of the accelerator pedal depressed is large, the accelerator opening $\theta$ is in excess of the preset value $\theta_0$ so that the engine load is high. In this case, the processing routine advances from step 2400 to step 2600, in which there is selected the second speed change pattern of a low speed side cross gear ratio.

If it is judged in step 2200 that the present vehicle speed V is equal to or higher than the preset value $V_0$, or a vehicle speed exceeding the preset value has continued longer than a preset time, there is selected the third speed change pattern of a high speed side cross gear ratio, and a gear shift is made in accordance with the third speed change pattern as long as the present vehicle speed V does not decrease to below the preset value $V_0$.

However, when it is judged in step 3200 that, in the above speed change pattern selection, the gear shift from the present speed range in the present speed change pattern to a speed range which is attained in a speed change pattern to be selected, falls under one of the prohibited conditions which will be sure to induce excessiveness in the transmission mechanism, the change-over of speed change patterns is prohibited thereby, the speed range row in the present speed change pattern is retained, and a gear shift is made in accordance with the present speed change pattern comprising the present speed range row and the present speed change diagram for controlling the gear shift between speed ranges in the present speed range row.

Figure 4:
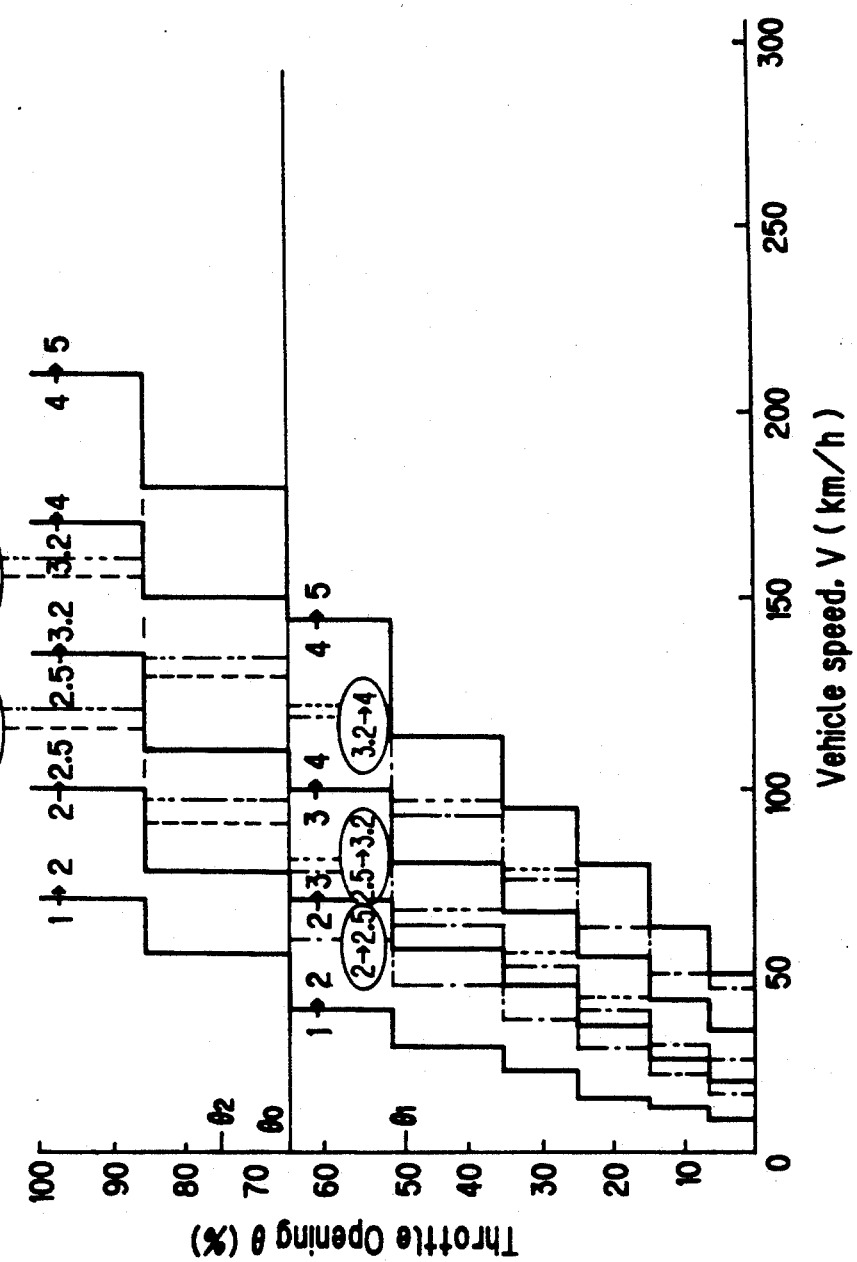
FIG. 4 is a speed change diagram.

FIG. 4 is a speed change diagram wherein the throttle opening $\theta(\%)$ and the vehicle speed V (km/h) are plotted along the axis of ordinate and the axis of abscissa, respectively.

In FIG. 4, a row of speed ranges in the first speed change pattern and a speed change diagram for controlling the gear shift between speed ranges in the speed change row are shown by solid lines in the region below a preset throttle opening value $\theta_0$ on the axis of ordinate, in the relation between the throttle opening $\theta$ and the vehicle speed V, while a row of speed ranges in the second speed change pattern and a speed change diagram for controlling the gear shift between speed ranges in the speed range row are shown by solid lines in the region above the preset value $\theta_0$, in the relation between the throttle opening and the vehicle speed V.

When the vehicle speed V is lower than the preset value $V_0$ in step 2200, the throttle opening change speed $\alpha$ is lower than the preset value $\alpha_0$ in step 2300, and the present throttle opening $\theta_1$ is smaller than the preset value $\theta_0$ in step 2400, the processing routine advances to step 2500, in which there is selected the first speed change pattern having a gear ratio suitable for normal running.

When, in this state, the accelerator pedal is depressed and the throttle opening $\theta_2$ exceeds the preset value $\theta_0$, there is selected the second speed change pattern of a low speed side cross gear ratio wherein the gear ratio step is low against changes in vehicle speed at throttle opening values larger than the preset value $\theta_0$. In this case, a speed range in the second speed change pattern selected in step 3000 is calculated, then in step 3100 a speed range in the first speed change pattern as the present speed change pattern is inputted and the processing routine advances to step 3200. As set forth above and can be seen from Table 1, the speed ranges which require in the gear shift only two engaging elements in the first and second speed change patterns are 1st, 2nd, 4th and 5th speed ranges which are common to both patterns. In these speed ranges there is involved no difficulty in the gear shift of both speed change patterns. Then, the processing routine advances to step 3300, in which the change-over of speed change patterns is carried out.

If, in the step 3300, the detected present speed range in the first speed change pattern is 3rd speed range for example, the change to the second speed change pattern and the gear shift from the 3rd speed range in the transmission to 2.5th or 3.5th speed range is prohibited.

As noted previously, the gear shift from 3rd to 2.5th speed range and that from 3rd to 3.2nd speed range fall under the prohibited conditions requiring engagement and release of three or more frictional engaging elements, so that the change-over between the speed change patterns is prohibited and the present speed change pattern is retained until a speed range which permits gear shift is reached, or a gear shift is made from the present speed range to a speed range not falling under any one of the prohibited conditions.

Also in the case of down-shift, the change-over between speed change patterns under the prohibited conditions is not performed.

In FIG. 4, the speed change diagram shown by broken lines in the region above the present value $\theta_0$ of the throttle opening $\theta$ plotted along the axis of ordinate is a speed change diagram between speed ranges of 2nd–3nd and 3rd–4th when an extension is made in the transmission at a throttle opening $\theta$ of 100% in accordance with the first speed change pattern.

As mentioned above, when it is detected that the vehicle speed V is lower than the preset value $V_0$ and the throttle opening $\theta$ is equal to or exceeds the preset value $\theta_0$ during gear shift in the transmission 3 according to the first speed change pattern, the speed change pattern selecting means 1100 outputs to the speed change pattern determining means 1200 a signal indicating that the second speed change pattern should be selected. However, in the case where the speed ranges detected by the present speed range detecting means 1300 are the foregoing 3rd speed range, the speed change pattern determining means 1200 prohibits the change-over from the first speed change pattern to the second speed change pattern because it stores conditions of the gear shift from 3rd speed range in the transmission 3 to 2.5th and 3.2nd speed ranges as the prohibited conditions. Consequently, the present 3rd speed range in the transmission 3 is maintained. As to speed change patterns, the first speed change pattern is retained because the change-over from the first speed change pattern to the second is prohibited. As shown in FIG. 4, therefore, if the speed change diagram of the first speed change pattern wherein the throttle opening $\theta$ is larger than the preset value $\theta_0$ is stored in the electronic controller 1000 as indicated by broken lines in the same figure, the electronic controller 1000 can output a signal instructing the gear shift from 3rd to 4th speed range in accordance with the stored speed change diagram indicated by broken lines in the first speed change pattern even in the case where the throttle opening $\theta$ has exceeded the preset value $\theta_0$. Therefore, in the case where the driver holds the throttle opening $\theta$ at a value larger than the preset value $\theta_0$, a gear shift, in the transmission, from 3rd to 4th speed range is made in accordance with the first speed change pattern which is kept in the electronic controller 1000. In the case where the electronic controller 1000 again detects that the vehicle speed V is lower than the preset value $V_0$, but that the throttle opening $\theta$ exceeds the preset value $\theta_0$, and sets the speed change pattern to the second speed change pattern in step 2600, in accordance with the flowchart shown in FIG. 3, there is no reason for falling under the prohibited conditions in step 3300 since the speed range calculated in step 3000 is 4th or 5th speed range in the speed range row of the second speed change pattern. Therefore, the transmission 3 is changed over from the first speed change pattern to the second speed change pattern and outputs to the hydraulic controller 90 a signal for carrying out a gear shift using the speed ranges and speed change diagram in the second speed change pattern.

The gear shift between speed ranges after the throttle opening $\theta$ exceed the preset value $\theta_0$ in the first speed change pattern and before the change-over to the second speed change pattern is not limited to the one performed by the speed change diagram shown by broken lines in FIG. 4 and with the throttle opening larger than the preset value $\theta_0$ in the speed change pattern. As noted previously, that the throttle opening $\theta$ has exceeded the preset value $\theta_0$ despite of the vehicle speed V being lower than the preset value $V_0$ indicates the driver's desire to drive at a higher speed than the present speed, so that when the speed change pattern determining means 1200 has prohibited the change-over between speed change patterns, with only maintaining the speed change pattern before the prohibition, there sometimes occurs inconsistancy with the driver's will. More particularly, assume that, if the speed change pattern selecting means 1100 sets the speed change pattern to the second speed change pattern in step 2600 when the condition of throttle opening $\theta \geqq \theta_0$ is satisfied in step 2400 in the flowchart of FIG. 3, then if, in step 3000, the speed range attained in the speed range pattern thus set is assumed to be 4th speed range and, in step 3100, the present speed range detected is 3rd speed range. The gear ratios of 3rd and 4th speed ranges in the first speed change pattern are 1.405 and 1.000, respectively, according to Table 1, so that, the gear ratio step between the gear ratio is large. Accordingly, a gear shift from 3rd speed range to 4th speed range in the transmission may be attained in an early stage in accordance with the speed change diagram indicated by broken line in FIG. 4, thereby a change-over from the first speed change pattern to the second speed change pattern may be effected through the gear shift of the transmission into 4th speed range using the first speed change pattern. However, it is likely to take time for the subsequent gear shift to 5th speed range according to the second speed change pattern and consequently the vehicular running state may become tardy. In an embodiment of the present invention, therefore, if it is desired that the gear shift between speed ranges in the present speed change pattern is to be maintained after the speed change pattern determining means 1100 prohibits the change-over to the speed change pattern selected by the speed change pattern selecting means 1100, a speed change diagram according to the present speed change pattern in which the speed change lines between the speed ranges is shifted in a direction of a higher vehicle speed V (to the right-hand side in FIG. 4) by 3 to 10 km/h in terms of vehicle speed at the region above the preset value $\theta_0$ of the throttle opening $\theta$ can be prepared and stored in the electronic controller 1000 as shown by two dot-dash lines in FIG. 4.

In an embodiment of the present invention, moreover, when the change-over to the speed change pattern selected by the speed change pattern selecting means 1100 is prohibited by the speed change pattern determining means 1200, a special or temporary speed change pattern comprising a row of speed ranges including the present speed range detected by the present speed range detecting means 1300 and also including a plurality of speed ranges not falling under the foregoing prohibited conditions and a speed change diagram for controlling the gear shift between speed ranges in the speed range row is stored in the electronic controller 1000, and the gear shift of the transmission 3 is continued according to this speed change pattern, and thereafter, when a newly calculated speed range in said temporary speed change pattern no longer falls under the prohibited conditions for the present speed range detected by the present speed range detecting means 1300, then the speed change pattern determining means 1200 outputs a signal for the gear shift to the speed range in the selected speed change pattern.

In FIG. 4, the speed change diagram shown by dot-dash lines in the region below the preset value $\theta_0$ of the throttle opening $\theta$ plotted along the axis of ordinate represents a speed diagram between 2nd and 2.5th, between 2.5th and 3.2nd, and between 3.2nd and 4th speed ranges below the preset value $\theta_0$ according to the second speed change pattern in the transmission.

In an embodiment of the present invention, when it is detected that the vehicle speed V is lower than the preset value $V_0$ and that the throttle opening $\theta$ is smaller than the preset value $\theta_0$ during gear shift of the transmission 3 according to the second speed change pattern, the speed change pattern selecting means 1100 outputs to the speed change pattern determining means 1200 a signal indicating that first speed change pattern should be selected. In this case, when the speed range detected by the present speed range detecting means 1300 is, say, 2.5th or 3.2nd speed range, the gear shift to 3rd speed range in the first speed change pattern falls under the prohibited conditions, so that the operation according to the second speed change pattern shown by dot-dash lines in FIG. 4 is continued without change-over to the first speed change pattern, and upon shifting-down to 2nd speed range or shifting-up to 4th speed range, the speed change pattern determining means 1200 outputs to the hydraulic controller 90 a signal indicating the carrying out a speed range change-over to the first speed change pattern.

Also as to the speed change diagram wherein the throttle opening $\theta$ in the second speed change pattern is smaller than the preset value $\theta_0$ can be the one in which the second change diagram is shifted to the low or high speed side relative to the vehicle speed V and the speed change diagram thus prepared may be stored in the electronic controller 1000 as shown by three dot-dash lines in FIG. 4.

According to one embodiment of the present invention moreover, the change-over between speed change patterns can be carried out with the vehicle speed V as a parameter.

Figure 5:
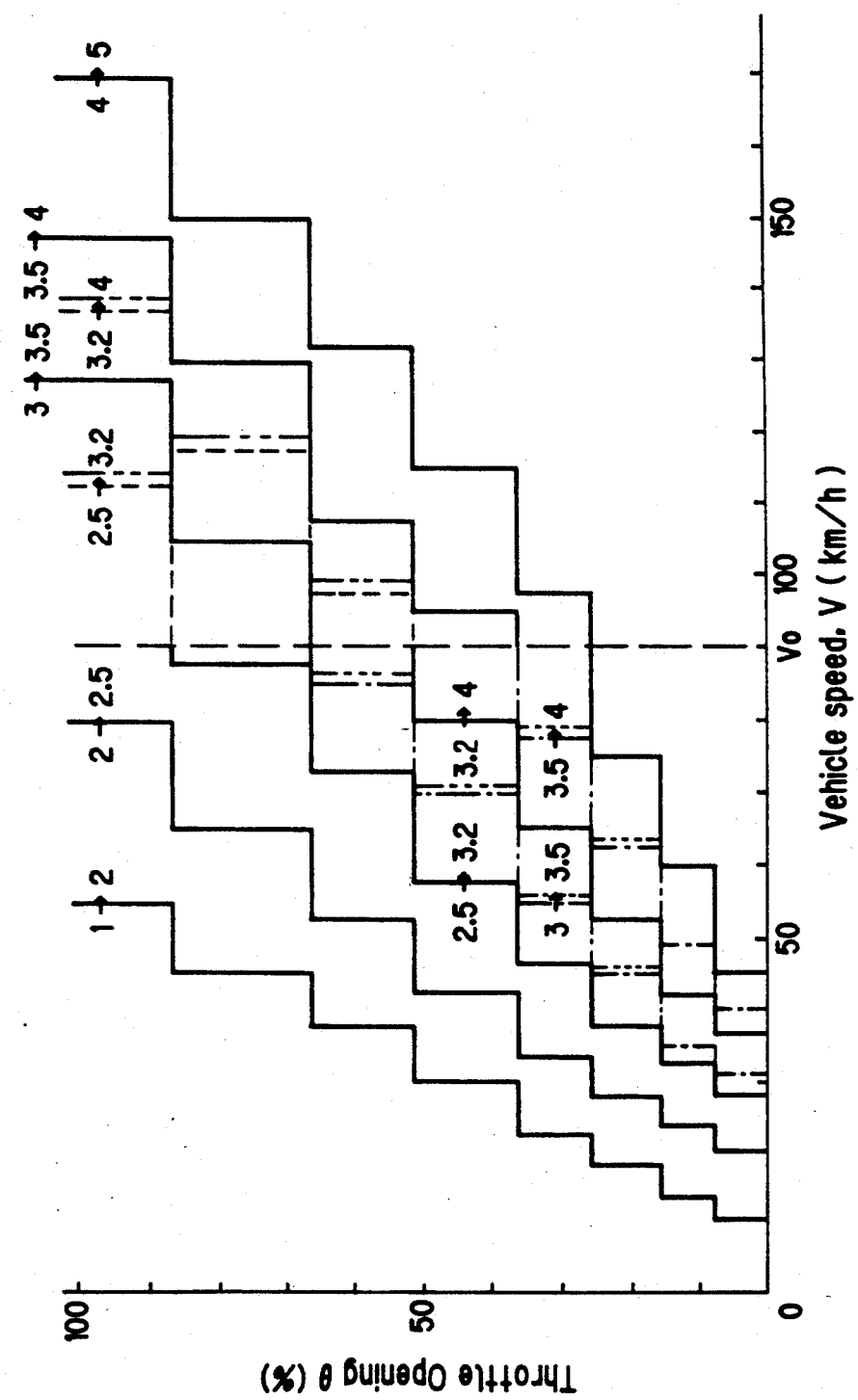
FIG. 5 is a speed change diagram similar to FIG. 4.

FIG. 5, like FIG. 4, is a speed change diagram in the second and third speed change patterns, wherein the throttle opening $\theta$(%) and the vehicle speed V (km/h) are plotted along the axis of ordinate and the axis of abscissa, respectively.

In FIG. 3, when it is judged in step 2200 that a vehicle speed V equal to or exceeding the preset value $V_0$ has continued for a predetermined period, the processing routine advances to step 2700, the third speed change pattern is selected instead of the speed change patterns which have been set at the time when the vehicle speed V was lower than the preset value $V_0$. In the case where the second speed change pattern having a cross gear ratio on low speed side has been selected at the time when the vehicle speed V became lower than the preset value $V_0$, the change-over between speed change patterns is not performed at speed ranges other than 1st, 2nd, 4th and 5th speed ranges common to both speed change patterns. More specifically, as noted previously, the gear shift from 2.5th to 3rd speed range and that from 3.2nd to 3.5th speed range are prohibited.

Thus, when it is judged in step 3200 that the gear shift to be made is between speed ranges other than the speed ranges common to the second and third speed change patterns and other than the gear shift from 3.2nd to 4th speed range, the change-over between speed change patterns is prohibited and the speed range row in the present second speed change pattern is retained.

In the case where the first speed change pattern suitable for normal running is selected at a time when the vehicle speed V becames lower than the preset value $V_0$, the change-over between speed change patterns is carried out smoothly because the third speed change pattern includes all of the speed range in the first speed change pattern.

In FIG. 5, a speed change diagram for controlling the gear shift between speed ranges in the speed range row according to the second speed change pattern is shown by solid lines on the side where the vehicle speed V is lower than the preset value $V_0$, while on the higher vehicle speed side than the preset value $V_0$ there is shown, with solid lines, a speed change diagram for controlling the gear shift between speed ranges in the speed range row according to the third speed change pattern. In the same figure, the broken lines represent a speed change diagram prepared in the case where the vehicle speed V becames higher than the preset value $V_0$ in the second speed change pattern, while the dot-dash lines represent a speed change pattern prepared in the case where the vehicle speed V is lower than the preset value $V_0$ in the third speed change pattern, provided that the speed change diagram between 4th and 5th speed ranges is common to both the second and third speed change patterns.

When the speed change pattern now set in the controller 1000 is the second speed change pattern, and the vehicle speed V becomes in excess of the preset value $V_0$, the third speed change pattern is selected in step 2700 in the flowchart of FIG. 3. If the speed range calculated in step 3000 is 3.5th speed range, and the present speed range detected in step 3100 is 2.5th or 3.2nd speed range, the gear shift from 2.5th or 3.2nd speed range to 3.5th speed range falls under the prohibited conditions, as noted previously, so that this speed range change-over is prohibited in step 3200 and the second speed change pattern is retained. In the transmission 3, therefore, a gear shift is made from 2.5th to 3.2nd speed range, further from 3.2nd to 4th speed range, according to a speed range row and a speed change diagram between speed ranges in the speed range row in the second speed change pattern. When a gear shift to 4th speed range is attained, the processing routine advances to step 3300 in the flowchart of FIG. 3, in which a change-over is carried out to the third speed change pattern. In this case, if the speed change diagram shown by broken lines in FIG. 5 is assumed to be a speed change diagram wherein a gear shift from 1st to 5th speed range is attained by only the six speed ranges in the second speed change pattern, there is a possibility that the throttle opening $\theta$ will become excessive at the time of gear shift from 4th speed range in the second speed change pattern to 4th speed range in the third speed change pattern. Therefore, it is desirable that the speed change diagram for controlling the gear shift between speed ranges in the second speed change pattern at a vehicle speed V exceeding the preset value $V_0$ be shifted to the high speed side (right-hand side in the figure) by about 3 to 10 km/h in terms of vehicle speed V from the broken-line position in FIG. 5 and that this speed change diagram be stored in the electronic controller 1000 beforehand for utilization.

When a vehicle speed V lower than the preset value $V_0$ has continued longer than a preset time during speed change according to the speed range row and the speed change diagram for controlling the gear shift between speed ranges in the speed range row in the third speed change pattern, the first or the second speed change pattern is selected through steps 2200, 2300 and 2400 in the flowchart of FIG. 3. If the second speed change pattern selected in step 2600, the speed range calculated in step 3000 is 3.2nd or 2.5th speed range, and the present speed range detected is 3.5, the gear shift between speed range is prohibited in step 3200 and the third speed change pattern is retained. In the transmission 3, therefore, there is made shift-up from 3.5th to 4th speed range, or shift-down from 3.5th to 3rd, further to 2nd speed range, according to the speed range row and the speed change diagram for controlling the gear shift between speed ranges in the speed change row in the third speed change pattern. In this way, when gear shift is made to 4th or 2nd speed range, a change-over is made to the second speed change pattern. In this case, a speed change pattern can be prepared by shifting the speed change pattern shown by dot-dash lines in FIG. 5 to the low or high speed side relative to the vehicle speed V and stored in the electronic controller 1000.

What is claimed is:

1. A speed change control system of an automatic transmission, comprising: a transmission including a gear train for attaining a plurality of speed ranges by selective engagement and disengagement of a plurality of frictional engaging elements, a hydraulic controller for controlling the selective engagement and disengagement of the frictional engaging elements of the transmission, and an electronic controller for controlling said hydraulic controller and attaining a change-over between a plurality of speed change patterns comprising a row of speed ranges of different gear ratios and a speed change diagram for controlling the gear shift between speed ranges in said speed range row, said electronic controller including a speed change pattern selecting means, a present speed range detecting means and a speed change pattern determining means, said speed change pattern selecting means for selectively selecting one speed change pattern out of a first and a second speed change patterns and outputting a signal to said speed change pattern determining means based on outputs from a throttle opening sensor and a vehicle speed sensor, wherein said first speed change pattern comprises a row of speed ranges greater than a gear ratio width relative to changes in vehicle speed at a region where a throttle opening is less than a preset throttle opening value and a speed change diagram for controlling the gear shift between speed ranges included in said row of speed ranges at a region of the throttle opening being less than said preset value, and wherein the second speed change pattern comprises a row of speed ranges less than a gear ratio width relative to changes in vehicle speed at a throttle opening greater than said preset value and a speed change diagram for controlling the gear shift between speed ranges included in said row of speed ranges at a region of the throttle opening being greater than said preset value, said present speed range detecting means for detecting the present speed range in the transmission and outputting a detected signal to said speed change pattern determining means, and said speed change pattern determining means for judging in a comparative manner whether the gear shift from the present range detected by the present speed range detecting means to a speed range in the speed change pattern outputted by the speed change selecting means falls under any one of a predetermined prohibited conditions based on the signal inputted from said speed change pattern selecting means and said present speed range detecting means; and means for outputting to said hydraulic controller a signal indicating said gear shift and change-over to a speed range according to the selected speed change pattern selected by said speed change pattern determining means that said gear shift does not fall under any of said prohibited conditions, and outputting to said hydraulic controller a signal to temporarily carry out said speed range change-over to a speed range which is included in a row of speed ranges to be controlled by a speed change diagram in a temporary speed change pattern and gear shift thereto when it is judged by said speed change pattern determining means that said gear shift does not fall under any one of said prohibited conditions and outputting a signal indicating a re-starting operation of said electronic controller when it is judged by said speed change pattern determining means that said gear shift falls under one of said prohibited conditions, wherein said predetermined prohibited conditions include change-overs between two newly occurred speed ranges requiring simultaneous engagement and/or disengagement of three or more of frictional engaging elements in which the engagement and/or disengagement of the frictional engagements was not previously done and a changeover between two adjacent speed ranges in each of said row of speed ranges including said first, second and temporary speed change patterns.

* * * * *

UNITED STATES PATENT AND TRADEMARK OFFICE
CERTIFICATE OF CORRECTION

PATENT NO. : 5,191,814
DATED : March 9, 1993
INVENTOR(S) : Masahiko Ando, et al.

It is certified that error appears in the above-identified patent and that said Letters Patent is hereby corrected as shown below:

At the cover page, after "[73] Assignees:", please change "Aisan" to --Aisin--.

Signed and Sealed this

Twelfth Day of April, 1994

Attest:

BRUCE LEHMAN

*Commissioner of Patents and Trademarks*

*Attesting Officer*